Patented Apr. 10, 1951

2,548,155

UNITED STATES PATENT OFFICE 2,548,155

PREPARATION OF AMIDES

Thomas L. Gresham and Forrest W. Shaver, Akron, Ohio, assignors to The B. F. Goodrich Company, New York, N. Y., a corporation of New York No Drawing. Application October 2, 1948, Serial No. 52,597

8 Claims. (Cl. 260—561)

This invention relates to the production of N-substituted amides of aliphatic monocarboxylic acids, especially beta-hydroxy aliphatic monocarboxylic acids such as hydracrylic acid, and pertains particularly to a process for obtaining such amides in high yield and in a high degree of purity starting with reactants consisting of a water-soluble primary or secondary saturated monoamine and a water-soluble saturated aliphatic beta-lactone, particularly beta-propiolactone.

It is disclosed in U. S. Patent 2,356,459 to Frederick E. Küng that beta-lactones, that is, lactones or inner esters of beta-hydroxy carboxylic acids may be obtained in good yields by the reaction of a ketene with an aldehyde or ketone. In this manner beta-propiolactone (also called hydracrylic acid lactone) which has the structure

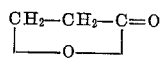

is economically obtained from ketene and formaldehyde.

It is also disclosed in U. S. Patent 2,375,005 to Küng that beta-propiolactone may be converted into hydracrylamide, this being accomplished by the process of heating the lactone with excess liquid ammonia for about 16 hours at 100° C. and then distilling the reaction product, whereby to recover a 50% yield of impure hydracrylamide from which the substantially pure product is obtained on recrystallization.

However, considerable difficulty is encountered in attempting to employ this process for the preparation of an N-substituted hydracrylamide from beta-propiolactone and a primary or secondary amine. Such an amine exhibits a tendency to react with beta-propiolactone to form a beta-N-substituted-amino propionic acid, in addition to an N-substituted hydracrylamide, with the result that the amount of amide formed is considerably less than theoretically possible and the product which is recovered on distillation is quite impure and changes in nature on standing, possibly because of interaction between the two different components. Moreover, attempts to purify such an N-substituted amide by crystallization from solvents have been wholly unsuccessful.

We have now discovered that very high yields (generally above 80% of theoretical) of substantially pure amides may be obtained from certain beta-lactones and certain amines by a process which involves bringing the reactants together in water solution at a temperature in the range of −10 to 50° C., followed by distillation, preferably under vacuum, of the resulting product. Carrying out the reaction in water solution at the low temperature influences the course of the reaction in such a manner that an N-substituted beta-hydroxy-amide is the principal and predominant product of the reaction, being formed almost exclusively, and greatly in preference to the beta-N-substituted-amino acid. However, distillation of the reaction product is also essential to the recovery of substantially pure amide since the N-substituted amides cannot be separated from even small amounts of impurities by solvent crystallization, and are so hygroscopic in nature that they cannot be crystallized from water.

Beta-propiolactone is the preferred beta-lactone for use in this process not only because it is more readily available and more economical in cost than other beta-lactones, but also because its use results in the production of highest yields of purest amides, and because the amides directly resulting from its reaction are N-substituted hydracrylamides which are quite useful chemicals per se and also are useful intermediates in the preparation of N-substituted acrylamides, the latter being polymerizable compounds of considerable importance in the preparation of resins, synthetic rubbers, etc. However, other saturated aliphatic beta-lactones which are water-soluble are also useful in the process, among which are such homologs of beta-propiolactone as beta-butyrolactone, beta-valerolactone, beta-isovalerolactone, alpha-methyl beta-propiolactone, alpha-ethyl beta-propiolactone, beta-isopropyl beta-propiolactone, beta-methyl-beta-valerolactone, etc., all of which are water-soluble and possess the general structure

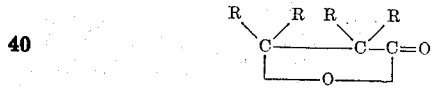

wherein each R is hydrogen or a lower alkyl group, so that the lactone contains from 3 to 6 carbon atoms.

The amine which is reacted with such a water-soluble saturated aliphatic beta-lactone to give a high yield of a substantially pure N-substituted amide, according to the process of this invention, must also be soluble in water, and preferably is completely miscible with water at the temperature of reaction. Such an amine must also contain only one amine group, that is, it must be a monoamine as distinguished from a diamine or polyamine; it must be primary or secondary in nature, that is, it must have at least one hydrogen atom attached to its single nitrogen atom; and it must be saturated and unsubstituted, that is, it must be composed solely of the amine group and attached saturated hydrocarbon structure. These requirements are critical since amines of other types, although capable of reaction with beta-lactones under other conditions, do not give high yields of substantially pure amides merely when brought into contact with a beta-lactone in water at −10 to 50° C. followed by distillation of the reaction mixture. Water-soluble alkyl amines such as methyl amine, ethyl amine, n-propyl amine, isopropyl amine. n-butyl amine, sec-butyl amine, tertiary butyl amine, sec-n-amyl amine and tertiary amyl amine, and water-soluble dialkyl amines such as dimethyl amine, diethyl amine, di-n-propyl amine, di-isopropyl amine and di-n-butyl amine, all satisfy the above requirements and are preferably used in this invention to give N-alkyl and N,N-dialkyl amides. Other water-soluble, unsubstituted saturated monoamines having hydrogen attached to nitrogen include ethylene imine, and its water-soluble homologs alkylene imines such as piperidine and pipecoline, and water-soluble cycloalkyl amines such as cyclopentyl amine all of which are also fully operable in the process herein disclosed.

When an amine of the character described and a beta-lactone of the character described are brought together in water solution at a temperature of −10 to 50° C. the reaction occurring leading to high yields of substantially pure amide may be expressed by the following general equation:

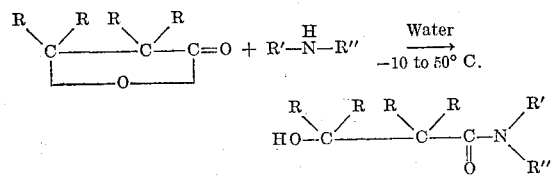

wherein each R is hydrogen or a lower alkyl group; R' is a lower alkyl group and R'' is hydrogen or a lower alkyl group or R' and R'' taken together represent an alkylene group.

In carrying out the reaction expressed by the above equation, it is generally preferable to add the beta-lactone, which is a liquid under ordinary conditions, to a water solution of the amine at such a rate that about ½ to 5 hours are required for addition of the entire amount of lactone, and with continued agitation of the solution during the addition. By this procedure an excess of amine over lactone is maintained which tends to prevent loss of some of the lactone through polymerization and thus to insure highest yields of the desired amide. However, the amine may be added to a stirred water solution of the lactone, if desired, without affecting the fundamental course of the reaction to give amide, or any other procedure for bringing the reactants together in water solution at −10 to 50° C. is also effective. Slow addition of one reactant to the other, and agitation of the solution during reaction are both helpful in maintaining the desired temperature (since the reaction is exothermic and may generate sufficient heat to cause the temperature to rise considerably above 50° C. if heat transfer is not efficient) but are not critical expedients in themselves. The time during which the reactants must be left in contact is likewise not critical and will depend upon the total quantities of reactants being used; in general the reaction is quite rapid and is complete, as evidenced by cessation of heat evolution, within a short time after all of the two reactants have been brought into efficient contact with each other.

The relative amounts of amine, lactone and water may be varied over wide limits and are not critical. In general substantially equimolecular proportions of reactants or the use of a molecular excess of amine, for example, from 1.0 to 1.2 moles of amine for each mole of beta-lactone, are preferred since no significant advantages are secured by the use of other proportions. The amount of water used as solvent is generally from 50 to 200% by weight of the combined quantity of reactants but these limits are not at all critical since the lower limit may be halved and the upper limit doubled without substantially affecting the result.

After the reactants are brought into contact and reaction to produce the N-substituted beta-hydroxy carboxylic acid has occurred, the reaction mixture is still in the form of a watery solution, the amide being soluble in water, as are the reactants. To separate and recover the pure amide distillation is necessary. This is preferably accomplished, when it is desired to recover the N-substituted beta-hydroxy carboxylic acid in the purest possible form, by distilling the water from the solution either at atmospheric or reduced pressure, preferably the latter (since the distillation temperature may be kept at a point sufficiently low to avoid any possibility of decomposition of the beta-hydroxy amide) and then distilling the remaining reaction product under vacuum, that is, at a pressure preferably below about 3 millimeters of mercury. In this manner the beta-hydroxy amide distills freely without any substantial decomposition, the distillate being of a high degree of purity and capable of being stored for long periods at room temperature without substantial chemical change.

It is also possible to distill the remaining product at reduced pressures above 3 millimeters of mercury or even at atmospheric pressure, but in this event the temperature of distillation is generally sufficiently high that dehydration of the N-substituted beta-hydroxy amide occurs to form N-substituted alpha-beta unsaturated amides. For example, under such conditions N-alkyl hydracrylamides distill with concomitant dehydration to give appreciable quantities of N-substituted acrylamides. Although the product so obtained is not pure, carrying out of the process in this way is sometimes desirable, as when the N-substituted hydracrylamide is produced for conversion to the corresponding acrylamide. Packing of the distillation column with activated carbon or a dehydration catalyst promotes the dehydration and permits of the obtainment of high yields of unsaturated amides of sufficient purity for polymerization purposes, directly from the watery reaction product of the amine and beta-lactone.

The process of this invention is further illustrated by the following examples. It should be understood however that variations in the examples in accordance with the foregoing disclosure may be effected without departing from the invention. In the examples all parts are by weight.

*Example 1*

72 parts (1 mole) of beta-propriolactone are added to a solution of 100 parts of a 33% solution of methyl amine in water (33 parts of methyl amine=1.06 moles) with stirring at such a rate that the heat evolved by the reaction thereby occurring maintains the temperature of the solution at 30 to 35° C., without cooling or external application of heat. One hour is required for addition of all the beta-propiolactone. When the water solution of reaction product has cooled to room temperature, the water present (as well as any unreacted amine or beta-propiolactone) is distilled under reduced pressure of about 50 mm. of mercury. The remaining product is then distilled under a vacuum of 2.0 to 3.0 mm. of mercury, and the product boiling at 133 to 135° C. is collected. This product, a water white liquid, is identified by analysis and by potentiometric titration as substantially pure N-methyl hydracrylamide. It is obtained in a quantity of 94 parts which represents a 91% yield. The analysis follows:

|   | Calculated for $C_4H_9O_2N$ | Found |
|---|---|---|
| C | 46.59 | 46.71 |
| H | 8.80 | 8.74 |
| N | 13.58 | 13.46 |
| Molecular weight | 103.12 | 106.0 |

Further proof of the high purity of the N-methyl hydracrylamide obtained in this example is to be found in the fact that it may be stored for long periods of time without any thickening or separation of solid product. However, when an organic solvent such as ether is employed in place of water in the reaction carried out as above and the product distilled, a much lower yield of distillate is secured and the distillate thickens on standing, indicating that this reaction, unlike the water reaction of this example, leads to appreciable quantities of an impurity, probably N-methyl-amino propionic acid, which cannot be separated so as to produce the amide in substantially pure form.

*Example 2*

The procedure of Example 1 is repeated using ethyl amine in place of methyl amine, maintaining the temperature at 20 to 25° C., and distilling the reaction product under a vacuum of 0.1 mm. of mercury. A 97% yield of substantially pure N-ethyl hydracrylamide (B. P. 106° C./0.1 mm.) is thereby obtained.

*Example 3*

To a water solution containing 100 parts (2.2 moles) of dimethyl amine and 200 parts of water there are added over a period of about 1 hour, 144 parts (2.0 moles) of beta-propiolactone while cooling the solution to maintain the temperature at about 20° C. Water is removed from the reaction mixture as in Example 1 and the reaction product distilled under a vacuum of 2 mm. of mercury. 185 parts (80%) of substantially pure N,N-dimethyl hydracrylamide (identified by potentiometric titration and by analysis) a water white liquid, B. P. 90–92° C./2 mm., are thus obtained. Analysis follows:

|   | Calculated for $C_5H_{11}O_2N$ | Found |
|---|---|---|
| C | 51.26 | 51.21 |
| H | 9.47 | 9.41 |
| N | 11.95 | 11.95 |

*Example 4*

108 parts (1.5 moles) of beta-propiolactone are dissolved in 200 parts of water and the resulting solution is saturated with gaseous dimethyl amine, the amine being bubbled into the solution for a period of 3 hours while maintaining the temperature at 20° C. On working up of the product as in Example 3, a 70% yield of substantially pure N,N-dimethyl hydracrylamide is obtained. There is also obtained a 15% yield of a solid product melting at 154–155° C. which analyzes for two lactone units per nitrogen atom. This example indicates that high yield of amide is secured when the amine is added to the lactone in water solution, but that the presence of excess lactone during the reaction also leads to the reaction of more than one mole of lactone.

*Example 5*

72 parts (1 mole) of beta-propiolactone are added to a water solution containing 80 parts (1.1 moles) of diethyl amine with stirring and while maintaining the solution at a temperature of 10 to 20° C. On removal of the water by distillation at reduced pressure and distillation of the product at a pressure of 1 mm. of mercury, 115 parts (80%) of substantially pure N,N-diethyl hydracrylamide a water white liquid, B. P. 80–82° C./1 mm., are obtained.

When the example is repeated except that the final distillation is carried out at reduced pressure of 10–20 mm. of mercury, the distillate consists of N,N-diethyl hydracrylamide together with some N,N-diethyl acrylamide produced by dehydration. This distillate hardens on standing because of polymerization of the N,N-diethyl acrylamide present. When atmospheric pressure is employed in the distillation and the distillation is conducted in a column containing activated carbon packing, a high yield of N,N-diethyl acrylamide is obtained.

*Example 6*

72 parts of beta-propiolactone are added to a solution containing 80 parts of piperidine dissolved in 200 parts of water. The temperature of the solution rises to 30–50° C. Water is removed by distillation and the remaining product distilled under reduced pressure. There is obtained 133 parts of a liquid product which is identified as a substantially pure amide consisting predominantly of the hydracrylamide of the structure

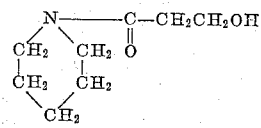

but also containing some acrylamide of the structure

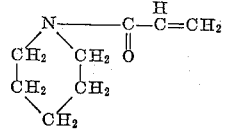

The hydracrylamide reacts with 3,5-dinitrobenzoyl chloride to give a solid ester melting at 106–107° C., while the acrylamide polymerizes to a hard thermoplastic resin.

While the above examples illustrate the process of this invention, they by no means include all the various embodiments. Thus, the examples may be repeated with any of the amines set forth hereinabove whereupon still other hydracrylamides, and/or the corresponding acrylamides are secured in good yield. Moreover, other water-soluble saturated aliphatic beta-lactones may be substituted for beta-propiolactone, as disclosed, with some reduction in yield but with the obtainment of predominant yields of amides homologous with hydracrylamides and acrylamides. All these and other embodiments of the invention disclosed herein are, unless otherwise indicated, within the spirit and scope of the appended claims.

This application is a continuation in part of and is a partial replacement for our copending applications, Serial Nos. 656,167 and 656,168, filed March 21, 1946, both of which are now abandoned.

We claim:

1. The method which comprises bringing together in water solution a beta-lactone of the structure

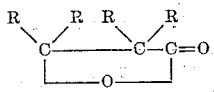

wherein each R is selected from the class consisting of hydrogen and lower alkyl groups so that the beta-lactone contains from 3 to 6 carbon atoms, and a compound of the class consisting of water-soluble primary amines of the formula

wherein R' represents alkyl and R'' represents hydrogen, water-soluble secondary amines of the structure

wherein R' and R'' each represent alkyl and water-soluble alkylene imines of the structure

wherein R' and R'' are joined together and taken together represent an alkylene group, while maintaining the temperature of the solution in the range of −10 to 50° C., whereupon chemical reaction occurs to form in water solution an amide of the structure

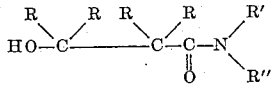

wherein R, R' and R'' have the significance above indicated, distilling the water from the solution and then vacuum-distilling the remaining product to recover the said amide in substantially pure form.

2. The method of producing an N-alkyl hydracrylamide which comprises adding beta-propiolactone to a water solution of a water-soluble primary alkyl monoamine while maintaining the temperature of the solution in the range of −10 to 50° C. whereupon chemical reaction occurs between the beta-propiolactone and the said amine to form an N-alkyl hydracrylamide in water solution, distilling the water from the solution and then vacuum distilling the remaining product to recover the said N-alkyl hydracrylamide in substantially pure form.

3. The method of claim 2 wherein the primary alkyl monoamine is methyl amine, the N-alkyl hydracrylamide recovered being N-methyl hydracrylamide.

4. The method of producing an N,N-dialkyl hydracrylamide which comprises adding beta-propiolactone to a water solution of a water-soluble dialkyl monoamine while maintaining the temperature of the solution in the range of −10 to 50° C. whereupon chemical reaction occurs between the beta-propiolactone and the said amine to form an N,N-dialkyl hydracrylamide in water solution, distilling the water from the solution and then vacuum distilling the remaining product to recover the said N,N-dialkyl hydracrylamide in substantially pure form.

5. The method of claim 4 wherein the dialkyl amine is diethyl amine, the N,N-dialkyl hydracrylamide recovered being N,N-diethyl hydracrylamide.

6. The method which comprises bringing together in water solution beta-propiolactone and a water-soluble monoamine composed exclusively of alkyl hydrocarbon structure attached to the nitrogen atom of an amine group having hydrogen attached to nitrogen, while maintaining the temperature of the solution in the range of −10 to 50° C., and then distilling the reaction product to remove water and recover a product consisting substantially of amide.

7. The method of preparing N-methyl hydracrylamide which comprises reacting beta-propiolactone and methyl amine in water solution at a temperature of about 30° C.

8. The method of preparing N-diethyl acrylamide which comprises reacting beta-propiolactone and diethyl amine in aqueous solution at a temperature of about 20° C., concentrating the reaction mixture by distillation of water under reduced pressure, and pyrolyzing the resulting reaction product by heating in the presence of a dehydration catalyst, to obtain N-diethyl acrylamide.

THOMAS L. GRESHAM.
FORREST W. SHAVER.

REFERENCES CITED

The following references are of record in the file of this patent:

UNITED STATES PATENTS

| Number | Name | Date |
|---|---|---|
| 2,375,005 | Kung | May 1, 1945 |

OTHER REFERENCES

Basler: "Ber. deut. chem.," vol. 17 (1884), pp. 1502 and 1503.

Johansson: "Chem. Zent," vol. 87 (1916), pp. 557 to 558.